United States Patent [19]
Leas et al.

[11] 3,779,893
[45] Dec. 18, 1973

[54] PRODUCTION OF DESULFURIZED LIQUIDS AND GASES FROM COAL

[75] Inventors: Lawrence E. Leas, Simi, Calif.; Robert L. Leas; Cecil J. Johnson, both of Columbia City, Ind.

[73] Assignee: Leas Brothers Development Corporation, Columbia City, Ind.

[22] Filed: Mar. 21, 1972

[21] Appl. No.: 236,643

[52] U.S. Cl............ 208/10, 48/201, 201/23, 423/138, 423/415
[51] Int. Cl............................................. C10g 1/08
[58] Field of Search............ 208/10; 48/201; 423/415, 138, 153, 561; 201/23

[56] References Cited
UNITED STATES PATENTS

| | | | |
|---|---|---|---|
| 3,088,816 | 5/1963 | Huntington | 48/63 |
| 3,107,985 | 10/1963 | Huntington | 208/10 |
| 3,440,162 | 4/1969 | Lawson | 201/23 |

Primary Examiner—Delbert E. Gantz
Assistant Examiner—J. W. Hellwege
Attorney—John J. Byrne

[57] ABSTRACT

An integrated process for simultaneously recovering liquid and gaseous products from coal. A slurry is formed from crushed coal and recycled oil and is introduced to a three-zone reactor along with a hydrocracking catalyst and sand, the latter of which acts as a conveying medium. In the first zone, coal liquids are extracted and conveyed to a fractionation unit. In the second zone, the carbon coked on the solids is gasified with air creating a producer gas which flows upwardly countercurrent to the downward flow of the aforementioned mixture and supplying heat for the extraction stage. In the third stage, the remaining carbon is gasified with oxygen and carbon dioxide to a substantially nitrogen-free carbon monoxide. The carbon monoxide is desulfurized in a metal oxide bed.

6 Claims, 1 Drawing Figure

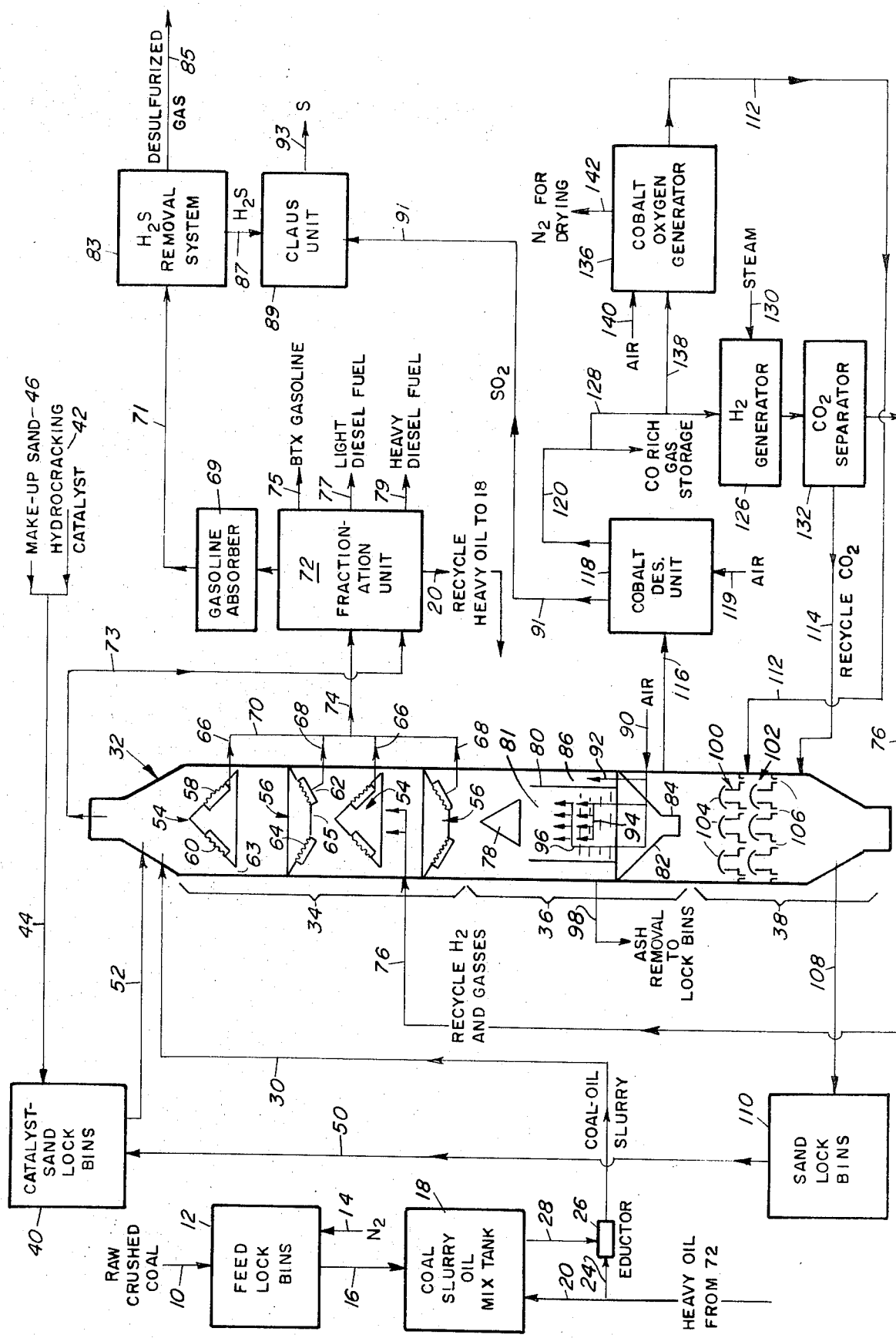

PRODUCTION OF DESULFURIZED LIQUIDS AND GASES FROM COAL

This invention relates to a process for simultaneously recovering liquid and gaseous products from raw coal.

It is desirable from an economic standpoint to use coal to produce both liquid and gaseous fuels since coal is relatively inexpensive compared to petroleum crude oil and is quite abundant in contrast to our rapidly dwindling domestic supply of petroleum and natural gas resources. However, the prior art apparatus for recovering liquids and gases from coal is quite complicated and inefficient, placing the operation cost thereof out of proportion such that the production of fuels from coal is not commensurate with the costs involved. Another drawback to using coal as the source of fuel is the substantial pollutants it contains primarily in the form of sulfur, requiring the end products to be desulfurized prior to consumption.

It is an objective of this invention to provide a relatively simple and economically feasible process for simultaneously recovering liquid and gaseous fuels from coal.

It is a further objective of this invention to provide means for desulfurizing the liquid and gaseous products recovered from coal prior to consumption thereof.

It is a further objective of this invention to provide an integrated process wherein the liquid and gaseous products are simultaneously recovered from the coal in a single reactor tower. The tower is divided into a plurality of zones for various stages of separation thereby eliminating the need for costly, inefficient transfer apparatus as is required when separate reactors are used for the individual stages of separation.

It is a further objective of this invention to provide an integrated process for recovering liquid and gaseous fuels from coal wherein the catalyst used in the hydrocracking stage is continuously regenerated and recycled for further use.

It is a further objective of this invention to utilize sand, metallurgical slag or the like as a conveying medium. The sand is mixed with the coal and catalyst and assists in propelling the coal particles downwardly through the vertically stacked zones in the reactor tower. The particular feature is related to the process described in U.S. Pat. No. 3,617,464, dated Nov. 2, 1971, entitled COAL EXTRACTION METHOD AND APPARATUS.

It is a further objective of this invention to provide an integrated process including various separation zones in a single reactor tower wherein the heat from one zone can be utilized in an adjacent zone. The gases produced in lower zones heat the solids in the upper zones by direct gas-solid contact.

More particularly, raw, crushed coal is fed to a lock-bin, feeder and is dried by the injection of hot nitrogen or other suitable drying gas. The coal is then mixed with a solvent such as a tetralin-decalin solution or recycle oil and the slurry is fed to the top of the reactor tower at which point it is mixed with sand, metallurgical slag or the like and a hydrocracking catalyst such as cobalt, tungsten, molybdenum or iron. The reactor tower is divided into three zones for various stages of operation. In the top zone, the coal liquids are extracted and are hydrocracked with hydrogen and other gases introduced to the bottom of the zone. The extracted liquids are then conveyed to a fractionation unit. The extracted, residual heavy hydrocarbons are coked. Heat for this zone is supplied from a second or middle zone wherein the coke, sand and other carbonaceous materials are gasified by the injection of heated air resulting in heated producer gas which is passed upwardly through the middle zone and through the first zone and is taken off the top of the reactor and conveyed to the fractionation unit. Also in the second zone the fly ash is fluidized and separated out for removal from the reactor tower. The solids continue to flow downwardly to a third or bottom zone wherein any remaining carbon is gasified with oxygen and carbon dioxide to produce a substantially nitrogen-free carbon monoxide. The carbon monoxide is taken off and desulfurized in a metal oxide bed, preferably cobalt oxide and the resultant desulfurized carbon monoxide is conveyed to a distribution points and used to produce hydrogen for the first zone and carbon monoxide for the bottom zone. A second cobalt oxide bed is provided for the vacuum recovery of oxygen for use in the bottom zone. Hydrogen sulfide is recovered from the gases exiting the fractionation unit. Sulfur dioxide is recovered from the cobalt oxide desulfurizing unit during regeneration thereof. The hydrogen sulfide and sulfur dioxide are conveyed to a standard Claus unit for the recovery of elemental sulfur. The catalyst, having been regenerated by the heated hot carbon dioxide and oxygen in the bottom zone, and the sand, slag, etc., are recycled through an appropriate lock-bin feed to the top of the reactor where it is again mixed with the incoming coal-solvent slurry, fresh make-up sand and catalyst feeds.

These and other objects of the invention will become more apparent to those skilled in the art by reference to the following detailed description when viewed in light of the accompanying drawings wherein:

The single FIGURE is a diagrammatic illustration of the process of this invention.

Raw, crushed coal is fed via line 10 to a conventional feed lock-bins 12 wherein the coal is dried by warm, inert gases such as nitrogen introduced via line 14. The dried coal is conveyed via line 16 to tank 18 wherein it is mixed with oil introduced via line 20 to produce a coal-solvent slurry. A portion of the oil is pressured through line 24 by a suitable pump (not shown) and an eductor 26 to draw the coal-oil slurry through line 28 and into line 30 for introduction to the top of the reactor tower 32. The reactor tower is a vertically disposed cylindrical vessel, sectioned into three contiguous zones, a top zone 34, a middle zone 36 and a bottom zone 38 for various stages of separation of liquid and gaseous fuels from the coal introduced to the top of the reactor.

A hydrocracking catalyst such as cobalt, molybdenum, tungsten, iron or the like from source 42 is introduced to lock-bin 40, via line 44. In order to assist the slurry, and catalyst in flowing downwardly through he zones of the reactor tower, sand, metallurgical slag or other suitable inert particulate material is introduced to the lock-bin 40 from the source 46 and line 44. Recycled sand and catalyst is also introduced into the lock-bin 40 via line 50. The catalyst-sand mixture is introduced into the top of the reactor 32 via line 52 and is intermixed with the coal-oil slurry.

The top zone or hydrocracking zone 34 includes alternating convex and concave baffles 54 and 56 respectively. The baffles 54 are of a suitable metal material and include an annular collection chamber 58 on the underside thereof communicated to the upper surface of the baffle 54 through a suitable grating or other perforate surface 60. Likewise, each baffle 56 is provided with an annular collection chamber 62 which is communicated to the upper surface of the baffle through perforate surface 64. Fluid lines 66 and 68 lead from the collection chamber 58 and 62 respectively and are communicated to a manifold line 70 for eventual introduction into a fractionation unit 72 via line 74. Because of the dispositions of the alternately convex and concave baffles forming annular and central openings 63 and 65 respectively, the sand, coal and catalyst mixture flows downwardly through zone 34 in a zig-zag pattern, greatly enhancing liquid, solid and gas contact. Suitable valves may be placed in the various outlet lines from the annular collection chambers to regulate the rate of liquid removal. Further, the sand concentration can be increased as required to regulate the speed of the downward travel of the mixture thereby controlling the rate of liquid extraction. Hydrogen is introduced adjacent the bottom of the first zone 34 via line 76 for hydrocracking the extracted liquids.

The second zone is in free communication with the first zone and includes an imperforate conical baffle 78 and an inner cylindrical vessel 80 disposed vertically below the baffle 78. Underlying the vessel 80 is a funnel 82 having a spout 84 through which solids from the middle or second zone pass to the third or bottom zone. The inner vessel 80 and the outer walls of the reactor tower 32 define an annular chamber 86. The baffle 78 is of a smaller diameter than that of the top opening of the vessel 80 such that the heavier solids flowing from the top zone will be permitted to flow into the central chamber 81 of the vessel 80. Air is introduced to the bottom of the annular chamber 86 from a suitable source via lines 90 and 92. Air from the same source is introduced to the chamber 81 at vertically spaced levels 94 and 96 through a series of horizontally disposed nozzles. The air introduced at 94 and 96 gasifies the carbonaceous material in the downwardly flowing solids to producer gas, which flows upwardly through the open end of vessel 80 to the first zone in a direction countercurrent to the downward flow of solids. The lighter coal ash is fluidized by the upwardly flowing producer gas and is caused to settle in the annular chamber 86 wherein air introduced via line 92 burns any residual carbon off of the coal ash. The coal ash is then taken off via line 98 through suitable lock bins (not shown) and then to disposal. The top section of the middle zone or air gasifier zone contains a fluid bed since the coal ash particles are fluidized and forced outwardly to the chamber 86, while the bottom section of the middle zone contains a moving solid bed of sand, catalyst particles and other residual particles.

The sand and catalyst then flows downwardly through funnel 82 and spout 84 to the third zone for oxygen and carbon dioxide gasification of any remaining carbon. The zone includes vertically spaced baffles 100 and 102 each having hooded gas pipes 104 permitting the upward flow of gas through the moving solid bed and down-flow pipes 106 permitting the moving solid bed to pass through the baffle plates 100 and 102 and eventually out of the reactor tower through lines 108 to lock-bin 110 for recycling back to the top of the reactor tower via line 50. Oxygen is introduced in the area between baffle plates 100 and 102 via line 112. Carbon dioxide is introduced below the baffle plate 102 via line 114. Carbon dioxide helps cool the sand prior to its being recycled out through line 108. The downwardly flowing solid moving bed will seal the bottom zone from the middle zone against the upward flow of gases at spout 84.

The product carbon monoxide gases are substantially free of nitrogen since only oxygen and carbon dioxide are used to gasify the carbonaceous materials. However, the carbon monoxide will contain a substantial amount of sulfur; therefore, it is taken off via line 116 and conveyed to a cobalt oxide desulfurizing unit 118, wherein the cobalt oxide is in its higher oxide form. The sulfur-free carbon monoxide gas exits via line 120 and is sent to storage.

A certain amount of carbon monoxide is sent to a hydrogen generator 126 via line 128 wherein it is reacted with steam injected via line 130 to produce hydrogen and carbon dioxide. The hydrogen and carbon dioxide are passed through a carbon dioxide separator 132 with the hydrogen being sent via line 76 to the first zone in the reactor tower and the carbon dioxide being sent to the bottom zone 38 via line 114. Still another portion of the carbon monoxide is sent to an oxygen generator 136 via line 138. The oxygen generator includes at least two cobalt oxide beds operating alternately and a vacuum is applied to draw off oxygen via line 112 for introduction to the third zone 38. The carbon monoxide reacts with part of the oxygen in generator 136 to provide heat required for the endothermic reaction. Air is introduced into the oxygen generator via line 140 to regenerate the cobalt oxide therein. The nitrogen from the air stage is taken off via line 142 and a portion thereof may be used for drying the crushed coal in feed lock-bin 12.

The liquids taken from the first zone are introduced to a fractionation unit 72 via line 74. The producer gas from the second zone passes upwardly through the first zone and is taken off via line 73 for introduction to the bottom of the fractionation unit 72. The resultant fractionation products are taken off via lines 75, 77 and 79 as indicated, while the heavy residual oil is recycled from the bottom of the fractionation column via line 20 to the slurry tank 18. Fuel gas is taken from the fractionation unit via line 71 and passed through a gasoline absorber 69 and a hydrogen sulfide remover 83. The desulfurized fuel gas is taken off via line 85 and the hydrogen sulfide is sent via line 87 to a Claus unit 89.

Air is introduced to the cobalt oxide bed desulfurizing unit 118 via line 119 to oxidize the cobalt therein back to a higher oxide form after the desulfurization cycle, producing sulfur dioxide which is taken off via line 91 and introduced to the Claus unit 89. Elemental sulfur is recovered from the hydrogen sulfide and sulfur dioxide and is taken off via line 93.

It is to be understood that the cobalt oxide beds 118 and 136 comprise dual beds such that, in each unit, while one bed is in a sulfur removal cycle, the other bed may be oxidized or regenerated back to its higher oxide form by the introduction of regenerating air to provide continuous operation.

The process of this invention will be more fully understood with reference to the following examples:

EXAMPLE I

A western coal with the following analysis was extracted with a solvent/coal ratio of 2/1 by weight. The solvent used was a 75 percent tetralin-25 percent decalin solution (by weight).

Coal Analysis (moisture and ash free)

| | | | |
|---|---|---|---|
| Carbon | 75.93 per cent | Nitrogen | 1.53 per cent |
| Hydrogen | 4.77 per cent | Oxygen | 16.92 per cent |
| Sulfur | 0.83 per cent | | |

Sand of 1/1 weight ratio with coal was used. The coal was slurried with the solvent and bed into the extractor. The slurry was heated to 700°F. prior to injection. Sand was injected into the extractor along with the slurry. The vessel was maintained at 800°F and the coal residence time was 20 minutes. The liquid stream out of the extractor was hydrotreated at 1000 PSIA and 600°F and fractionated with the following weight analysis determined: (after solvent recovery)

Gas (mainly methane) — 2.4 percent
BTX Gasoline — 18.3 percent
Light Diesel — 26.8 percent
Heavy Diesel — 46.4 percent
Heavy Material for Recycle — 6.1 percent The overall hydrotreated weight yield of the gas-heavy diesel from coal was 63.4 percent based on moisture and ash free coal feed. The unextracted coal along with the sand was gasified with air to obtain a gas with a net heating value of 230 BTU/SCF. The calculated overall yield of liquids and gas was 88.3 percent (weight per cent) based on the coal feed and on a MAF basis.

EXAMPLE II

The same coal of Example I was subjected to the conditions of Example I with the exception that the coal/solvent ratio was 1/1 by weight. After hydrotreating and fractionation the liquid stream had the following weight composition:

Light Gases (mainly methane) — 2.1 percent
BTX Gasoline — 14.5 percent
Light Diesel — 22.4 percent
Heavy Diesel — 52.8 percent
Recycle Material (heavy) — 8.2 percent The liquid and hydrocarbon gas yeild from the coal was 38.1 percent based on moisture and ash free basis. The unextracted coal and sand was gasified with air to a gas with a net heating value of approximately 242 BTU/SCF. The calculated overall yield of fuel gas and liquids was 89.4 percent based on the carbon feed on a MAF basis.

EXAMPLE III

A Southern Illinois coal with the following moisture and ash free weight analysis was slurried with a solvent consisting of 75 percent tetralin — 25 percent Decalin (by weight) in a ratio of 2/1 weight to coal and heated to 500°F. prior to entering the extractor.

| | | | |
|---|---|---|---|
| Carbon | 76.7 per cent | Nitrogen | 1.6 per cent |
| Hydrogen | 6.1 per cent | Oxygen | 11.3 per cent |
| Sulfur | 4.3 per cent | | |

The extractor was maintained at 750°F and the slurry was mixed with an equal weight of sand as the coal so that the weight ratio of the sand/coal was 1/1. The solid residence time was 30 minutes and then the solids were gasified with air. The extracted liquids and solvent were hydrotreated at 1000 PSIA and 600°F. in excess hydrogen. After fractionation the following weight analysis was obtained.

Light Hydrocarbon Gases — 3.1 percent
BTX (gasoline fraction) — 19.2 percent
Light Diesel Fraction — 32.5 percent
Heavy Diesel Fraction — 36.8 percent
Recycle Fraction (bottoms) — 8.4 percent The hydrotreated yield (weight) of the MAF coal was 68.4 percent based on the total MAF coal charge (excluding the hydrogen required for hydrotreating). The solids were gasified with air to a fuel gas of approximately 125 BTU/SCF. The overall yield of the liquids and gas based on the MAF feed was 89.2 per cent.

EXAMPLE IV

The same type of coal as in Example III was extracted under the same conditions as in Example III with a solvent/coal weight ratio of 1/1. After fractionation the weight analysis gave:

Light Gas (hydrocarbon) Fraction — 2.8 percent
BTX (gasoline fraction) — 18.4 percent
Light Diesel Fraction — 35.7 percent
Heavy Diesel Fraction — 33.9 percent
Bottoms (recycle) Fraction — 9.2 percent The solids were gasified with air to a gas with a heating value of approximately 185 BTU/SCF and the overall yield (weight percent) was 90.1 percent based on the MAF coal feed. The hydrotreated fraction yield was 41.2 percent (weight) based on the MAF coal feed.

EXAMPLE V

The same type of coal as in Examples III and IV was heated in the extractor with no solvent and the extracted liquids after hydrotreating gave the following weight analysis:

Light Hydrocarbon Gas Fraction — 2.3 percent
BTX (gasoline fraction) — 10.4 percent
Light Diesel Fraction — 34.2 percent
Heavy Diesel Fraction — 42.7 percent
Bottoms (recycle) Fraction — 10.4 percent The above hydrotreated fractions amounted to 21.4 percent of the coal MAF charged. The solids were gasified with air to give a gas having a heating value of 195 BTU/SCF. The overall yield (weight) of the liquids and fuel gas was 91.3 percent based on the MAF coal feed.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

We claim:

1. A method of simultaneously recovering fuel liquids and gases from coal comprising the steps of forming a slurry of crushed coal and oil, mixing the slurry with a catalyst and introducing said mixture to the top of a vertical reactor tower, dividing said tower into top, middle and bottom contiguous zones and passing said mixture continuously through said zones whereby liquids are extracted and taken off in said top zone, the carbon in said mixture is gasified in said middle zone with air, and any remaining carbon is gasified with oxygen and carbon dioxide to carbon monoxide in said bottom zone.

2. The method of claim 1 including the step of separating coal ash from said mixture in said middle zone by fluidizing said ash from said mixture.

3. The method of claim 1 including the step of introducing an inert, solid particulate material into said mixture to serve as a conveying medium for said slurry and catalyst through said zones.

4. The method of claim 3 wherein said sand and catalyst are taken from said bottom zone and recycled to said top zone.

5. The method of claim 1 including the steps of removing said carbon monoxide from said bottom zone and desulfurizing it by reacting the sulfur therein with cobalt oxide in its higher oxide form to form cobalt sulfide.

6. The method of claim 3 wherein said mixture follows a tortuous path through said top zone.

* * * * *